United States Patent [19]

Sargeant

[11] 4,104,804
[45] Aug. 8, 1978

[54] METHOD FOR DRYING EXPLOSIVE MATERIALS

[76] Inventor: Ralph G. Sargeant, 408 W. Windsor St., Lakeland, Fla. 33803

[21] Appl. No.: 717,663

[22] Filed: Aug. 25, 1976

Related U.S. Application Data

[63] Continuation-in-part of Ser. No. 461,964, Apr. 18, 1974, abandoned.

[51] Int. Cl.² .............................................. F26B 3/34
[52] U.S. Cl. .......................................... 34/1; 23/266; 219/10.81
[58] Field of Search ........................ 149/109.6; 23/266; 219/10.55 M, 10.81; 34/1, 4, 39, 40

[56] References Cited

U.S. PATENT DOCUMENTS

| | | | |
|---|---|---|---|
| 2,031,086 | 2/1936 | Woodruff et al. .................... | 198/752 |
| 2,349,300 | 5/1944 | Olsen ......................................... | 34/4 |
| 2,445,741 | 7/1948 | Franz et al. ............................ | 23/266 |
| 3,210,160 | 10/1965 | Gordon .................................. | 23/266 |
| 4,014,655 | 3/1977 | Brunnberg ............................. | 23/266 |

*Primary Examiner*—John J. Camby
*Assistant Examiner*—Larry I. Schwartz
*Attorney, Agent, or Firm*—Roylance, Abrams, Berdo & Farley

[57] ABSTRACT

Explosive materials such as gun powder and rocket propellants are dried safely by supplying the material in particulate form to a drying zone, passing the particulate material through the drying zone while agitating the material to cause the particles to move in random fashion, subjecting the particulate material to electromagnetic radiation to heat the moisture contained within the particles, maintaining a relatively cool gaseous atmosphere in the drying zone, and recovering the particulate material from the drying zone with the particles having a reduced moisture content and a temperature which is low as compared to the ignition temperature of the particles.

11 Claims, 7 Drawing Figures

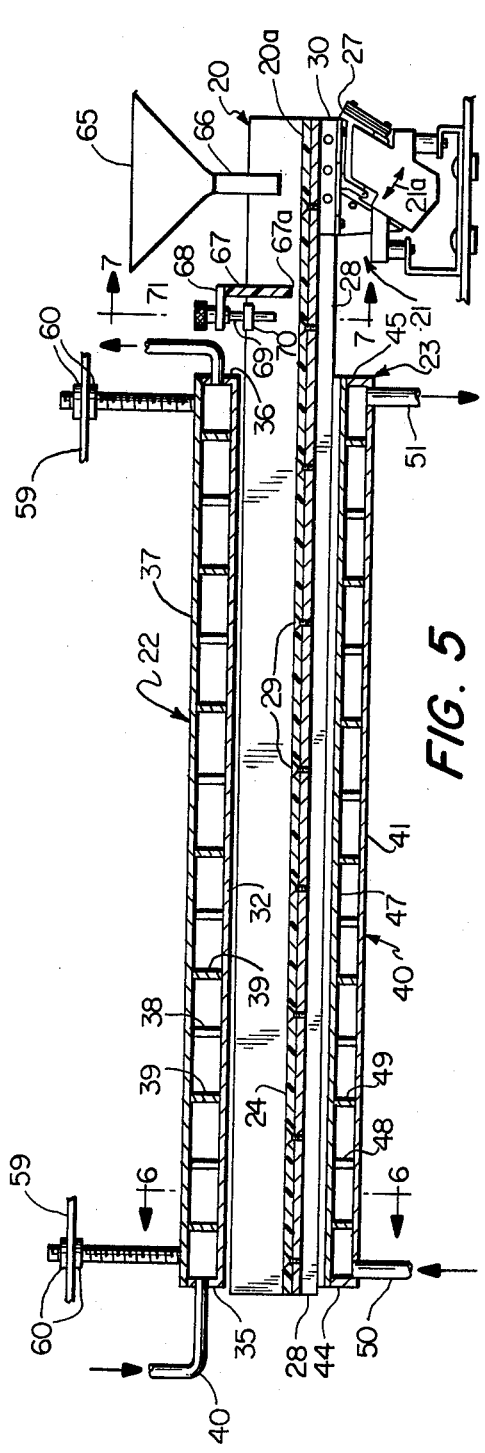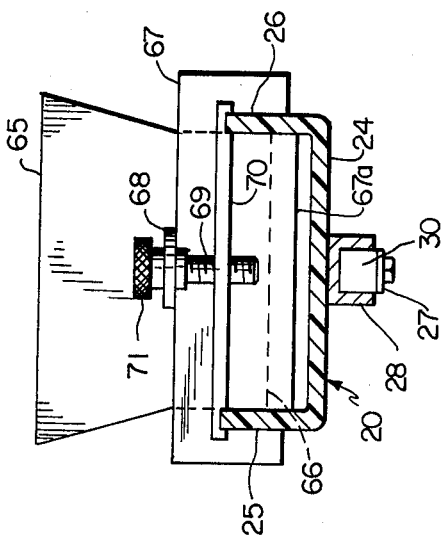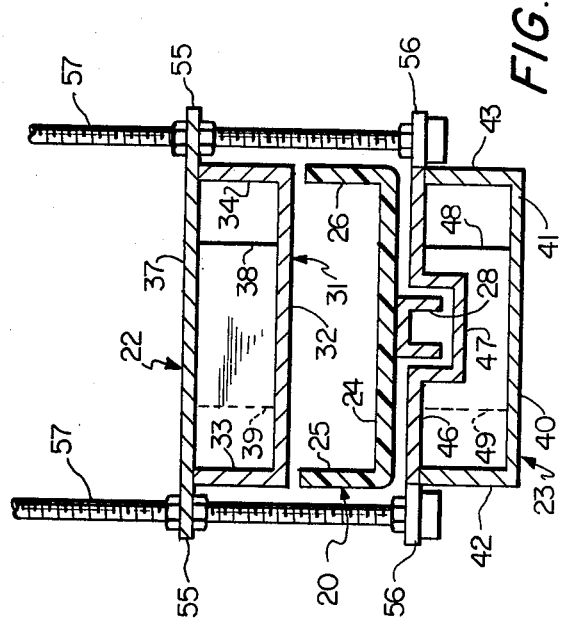
FIG. 5
FIG. 7
FIG. 6

METHOD FOR DRYING EXPLOSIVE MATERIALS

RELATED APPLICATIONS

This application is a continuation-in-part of my co-pending application Ser. No. 461,964, filed Apr. 18, 1974 now abandoned. Apparatus disclosed herein is claimed in my U.S. Pat. No. 3,885,119, issued May 20, 1975, from application Ser. No. 461,963, filed Apr. 18, 1974 now abandoned.

BACKGROUND OF THE INVENTION

Gun powders, solid rocket propellants and like particulate explosive materials are manufactured by methods which yield a product having a moisture content substantially higher than that ultimately desired. In the case of certain rocket propellants, for example, the moisture content can be as high as 70% or more by weight. The industry has therefore adopted various methods for drying explosive materials. Despite the fact that particulate explosive materials are especially sensitive to heat, most prior-art drying methods are thermal drying methods and have proved to be unduly dangerous. One such prior-art method, for example, subjects the moist explosive material to heat while the material is supported on an endless belt which conveys the material as it is being dried. Through a thermal drying method employing a conveyor belt may operate successfully for drying explosive materials for a prolonged period, the nature of the method and the equipment it employs is such as to promote unpredictable localized temperature build-ups which can cause fires and/or explosion of all the material being dried. The industry has accordingly continued to seek improved, safer methods for drying explosive materials.

OBJECTS OF THE INVENTION

A general object of the invention is to devise a method for drying particulate explosive materials in a manner which will present less danger of fire and explosion than do the thermal drying methods of the prior art.

Another object is to provide a method for drying particulate explosives which at least minimizes the danger of localized thermal build-ups.

A further object is to provide such a method which is capable of markedly reducing the moisture content of explosive particles without requiring that the overall temperatures of the particles be drastically increased.

SUMMARY OF THE INVENTION

The invention employs electromagnetic radiation, advantageously radio frequency energy, to heat the moisture content of the particles of explosive material selectively, so that the moisture is driven off the particles without drastically increasing the temperature of the particles per se. While the particulate material is being treated with electromagnetic radiation, it is subjected to agitation in such a fashion that no substantial quantity of the material is in persistent contact, i.e., more than transitory engagement, with any solid surface. Further, while the particles are being agitated and subjected to electromagnetic radiation, a gaseous atmosphere which is cool in comparison to the ignition temperature of the explosive material is maintained about the particles, so that the agitation of the particles is effective to cause the entire surface of each particle to be exposed in moisture- and heat-transfer relationship with the gaseous atmosphere. The particles so treated are recovered by discharging them from the treatment zone while at a reduced moisture content and a temperature which is relatively low as compared to the ignition temperature of the explosive material being dried. Advantageously, the electromagnetic radiation employed is radio frequency energy, the radio frequency field being established between two electrodes and the explosive material being passed between the electrodes by a generally horizontal vibratory conveyor operated in such fashion that the particles of the explosive material are in continuous random motion throughout their travel through the radio frequency field. The gaseous atmosphere which is maintained surrounding the moving particles can be air at room temperature and a relative humidity not exceeding 60%. At least the radio frequency electrode which is located below the vibratory conveyor is cooled and, advantageously, both electrodes are liquid-cooled. The dried particles are discharged at a temperature not exceeding, e.g., 150° F. and, advantageously, not exceeding 130° F.

In order that the manner in which the foregoing and other objects are achieved according to the invention can be understood in detail, particularly advantageous embodiments thereof will be described with reference to the accompanying drawings, which form part of the original disclosure hereof, and wherein.

Figure 1:
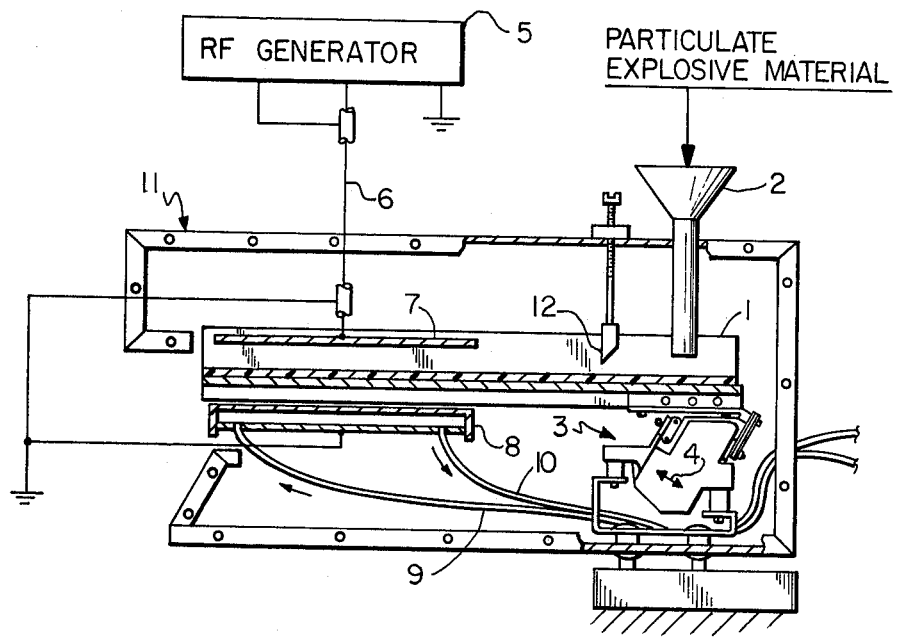
FIG. 1 is a semi-diagrammatic view of one apparatus with which the method can be practiced.

FIG. 5 is a longitudinal vertical sectional view of a particularly advantageous apparatus for practicing the method; and FIGS. 6 and 7 are transverse sectional views taken generally on lines 6—6 and 7—7, FIG. 5, respectively.

DESCRIPTION OF THE METHOD

The method is carried out by supplying the explosive as a particulate free-flowing solid material to a drying zone in which a gaseous atmosphere is maintained, passing the particulate material through the drying zone while agitating the particulate material to cause the particles thereof to move in random fashion without any substantial portion of the material residing in contact with any solid surface residing as a relatively static mass of particles, subjecting the particulate material to electromagnetic radiation to heat the moisture contained within the particles while the particulate material is being agitated in the drying zone, and recovering the particulate material from the drying zone with the particles having a reduced moisture content and a temperature which is low as compared to the ignition temperature of the explosive material. The method is advantageously carried out by removing a conventional radio frequency generator and electrode means to establish a radio frequency field, with the field being extended horizontally, and using a vibratory conveyor to both advance the particulate explosive material through the field and maintain the particles of that material in random motion as they pass through the field. The gaseous atmosphere supplied to the drying zone can be ambient, room temperature air at a relative humidity not exceeding about 60% and advantageously 10–50%, it being understood that both the temperature and the relative humidity of the gaseous atmosphere increases as drying proceeds but that the temperature of the atmosphere is maintained low in comparison to the ignition temperature of the explosive material.

The effect of the electromagnetic radiation is to heat the water content of the particles selectively, bringing the moisture to a temperature adequate to drive the moisture from the particle, but without substantially heating the particle per se in direct fashion. Though the precise manner in which radio frequency energy, for example, heats the moisture contained in solid material may not be fully understood, it is thought that the radio frequency energy excites the water molecules in such a manner that, at any instant, the molecules are driven in the direction exhibited by the field. As the radio frequency field goes positive, the water molecules are driven in one direction and, as the field reverses polarity, the nolecules seek to reverse their direction of travel. Thus, if the frequency of the field is 70 MHz, the orientation of water molecules exposed to the field tends to reverse 140 million times per second. Frictional heat results, being generated in the water molecules, and vaporization occurs almost instantaneously with the application of the energy. Since the particles are in constant random motion while being thus treated, and do not reside in contact with any solid surface for any significant period of time, the total surface area of each particle is exposed to the gaseous atmosphere for maximum heat transfer and optimum escape of the heated moisture into the atmosphere.

As seen in FIG. 1, the drying zone can be defined by an elongated generally horizontal trough 1 of U-shaped transverse cross-section, and the material to be dried can be supplied to one end of the trough 1 via a feeding funnel 2. The trough is vibrated, as by a conventional electromagnetic vibrator 3, with the vibration being essentially reciprocatory along a line, such as line 4, which slants upwardly and toward the end of the trough opposite funnel 2. With the trough operated at, e.g., 3600 cycles per minute and an amplitude of from a few thousandths of an inch to, e.g., 0.045 in. (1.14 mm.), particulate material supplied to trough 1 via funnel 2 is both agitated and caused to traverse the trough, ultimately being discharged therefrom at the end opposite the funnel. The nature of the agitation is such that the particles are in movement through the atmosphere in which the trough is located for most of the time required to pass through the trough. Contact of the particles with the solid surfaces of the trough, which are the only solid surfaces (other than others of the particles) to which the particulate material is exposed during passage through the drying zone, is essentially instantaneous. Save when the nature of the particles is such that agglomeration occurs, random particle-to-particle contact is instantaneous.

Electromagnetic radiation is applied to the mass of particles throughout a major portion of the time required for the particulate material to traverse the length of the trough. Advantageously, radio frequency energy from a conventional RF generator 5 is applied, as via a coaxial cable 6, to electrode 7. Electrode 7 is located above trough 1 and extends lengthwise thereof and parallel thereto. A second, grounded electrode 8 is disposed beneath the trough and parallel to the trough and electrode 7. Trough 1 is formed of a polymeric material which has good dielecteic properties, i.e., has a low dielectric constant and a low power factor and is therefore not significantly heated by radio frequency energy. As later described in more detail, the lower electrode 8 is advantageously a hollow, liquid cooled electrode, with a coolant, such as a machine oil which is not a conductor for radio frequency energy, supplied via input conduit 9 and outlet conduit 10, the oil being maintained at a suitable low temperature by being passed through a conventional heat exchanger (not shown). The combination of trough 1, vibrator 3 and electrodes 7, 8 is enclosed in a suitable radio frequency shielding structure 11, which can be of sheet aluminum. An adjustable levelling blade 12 is provided to determine the depth of the bed of particulate material on the bottom of trough 1.

Depending upon the particular explosive material and the particular process by which it has been produced, the particulate material supplied to the radio frequency field will have a moisture content ranging from several percent by weight to as high as 75% by weight. For usual purposes, this moisture content must be reduced to a value on the order of 1% by weight and preferably significantly less. The size and shape of the particles varies, depending upon the purpose to which the explosive is to be put and the specific nature of the explosive. Thus, a smokeless gun powder for shotgun shells may be in the form of platelets having a maximum dimension on the order of 0.01 in. (0.25 mm.), smokeless powder for military purposes may be in the the form of pheroidal particles with a maximum dimension on the order of 0.03–0.05 in. (0.76–1.3 mm.), and solid rocket propellants may be in the form of spheroidal particles having a maximum dimension on the order of 0.625 in. (1.59 mm.).

The radio frequency field can be established, with conventional RF generating equipment, with a frequency in the range of 5–100 MHz., advantageously 10–35 MHz., at power levels depending upon the "load" presented by the particulate material within the field. The free moisture content of the particulate material is heated dielectrically by the RF field, while the solid material of the particles is not itself directly heated significantly, and the moisture is driven to the surfaces of the particles. The atmosphere surrounding the particles in the RF field is maintained at a low relative humidity, below 60% and typically 10–30%, to promote evaporation of the moisture from the particles. Residence time of the particulate explosive material in the RF field depends upon the initial moisture content, the desired final moisture content of the material, and the RF power of the field. In general, the residence time can vary from 3 seconds to 5 minutes, with residence times from a few seconds to 1 minute being advantageous.

Figure 2:
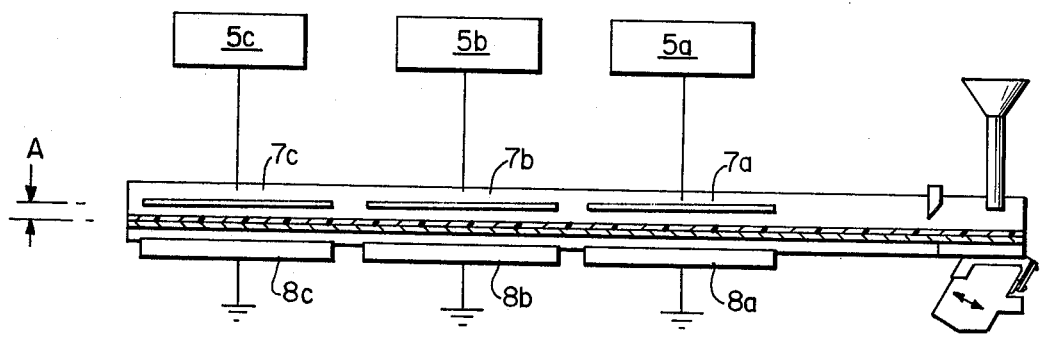
FIGS. 2–4 are diagrammatic view illustrating other apparatus with which the method can be practiced.

Advantageously, as seen in FIG. 2, the RF field can be established between a plurality of pairs of electrodes 7a, 8a–7c, 8c, and the electrodes are so arranged as to converge at angle A in the direction of travel of the particulate material through the drying zone. Since the moisture content of the particles decreases as the particles travel through the drying zone, the ability of the particles to absorb energy also decreases, so that there is a corresponding loss of effective power input to the explosive material if the electrodes are parallel. By positioning the electrodes in convergent relationship, with the angle of convergence properly related to the decrease in moisture content of the particles, uniformity of power input to the particulate material throughout the drying zone can be preserved. Electrodes 7a–7c are connected in conventional fashion each to a different one of the conventional RF generators 5a–5c, so that the RF power supplied to the particulate material can be adjusted independently in the portions of the drying zone occupied by the three electrode pairs.

Figure 3:
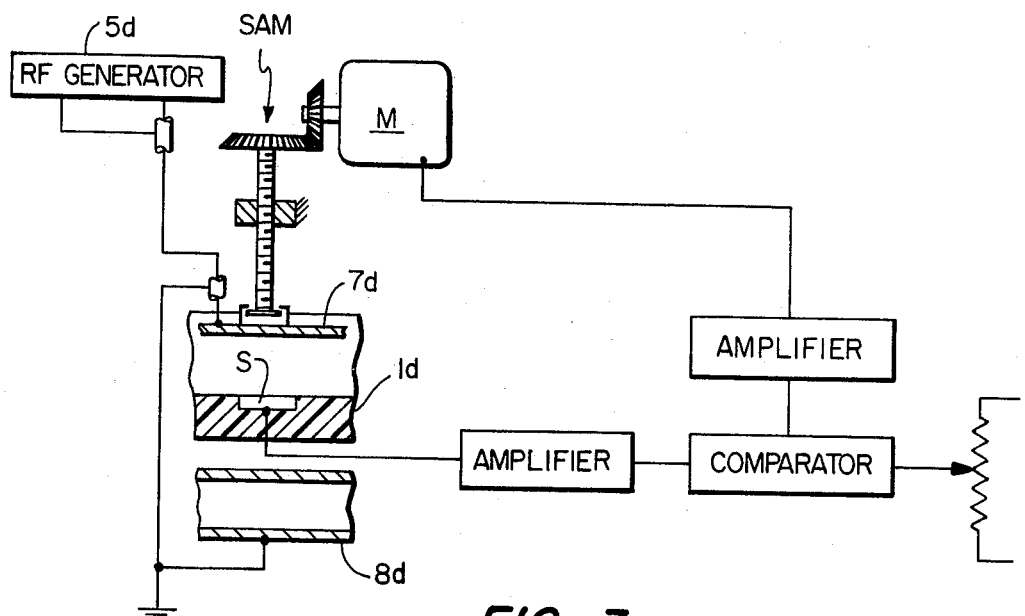

In some instances, it is desirable to adjust the RF power in accordance with the temperature of the particulate explosive material in the drying zone. This can be accomplished with the apparatus modified, as shown in FIG. 3, to include a temperature sensor and means controlled in response to the temperature sensor for adjusting the spacing between the electrodes. Temperature sensor S can be a conventional thermally variable impedence or a conventional thermocouple and can be embedded in the polymeric material of the vibratory conveying trough 1d so as to respond to the temperature at the upper surface of the trough, which temperature is related to the temperature of the particles being conveyed. An electrical signal from the temperature sensor is amplified and compared to a reference signal to provide a control signal which in turn is amplified and applied to drive motor M of a screw type adjusting mechanism SAM so as to change the position of upper electrode 7d in accordance with a characteristic of the control signal. With the reference signal adjusted to a known value, the control signal can be employed to drive motor M to increase the space between electrodes 7d and 8d when the temperature by the sensor S exceeds a predetermined value indicating that the particulate explosive material is warmer than desired. Employing a reversible motor, the system can also decrease the space between electrodes 7d and 8d when the temperature detected by sensor S falls below a predetermined value. Thus, the method can be practiced with an automatic reduction of RF power input in response to an undesirably warm temperature, or with automatic control of the RF power input such as to maintain the temperature of the particulate explosive material within a predetermined temperature range. The same result can be achieved, using the apparatus illustrated in FIG. 4, by using the control signal to directly control the RF generator 5f, as by use of a motor driven variable transformer.

Figure 4:
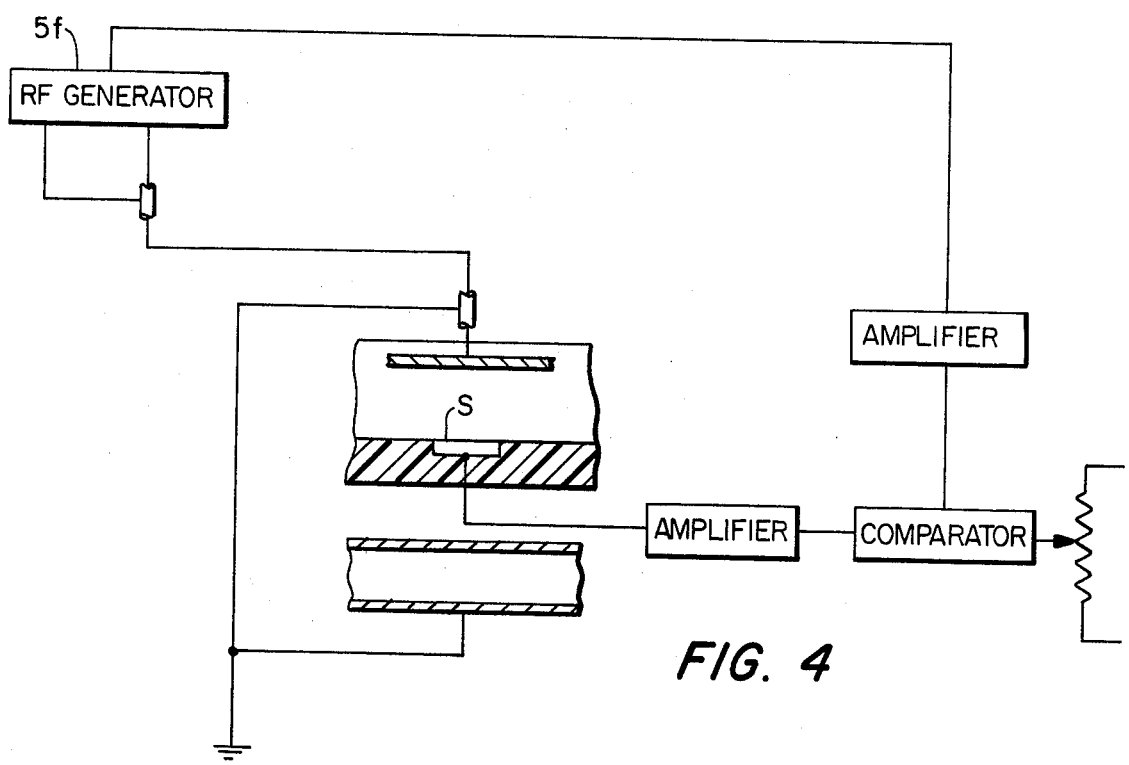

Use of the apparatus of FIGS. 3 and 4 is exemplary of the method when a variable characteristic within the drying zone, in this case temperature, is monitored and used as a reference for control of the RF power input to the particulate explosive material to assure maximum drying efficiency and preserve the safety against fire and explosion provided inherently by the method.

The method is suitable for drying all explosive materials which can be presented as particulate free-flowing solids capable of surviving without deflagration at particle temperatures of 95°–130° F. and which are not so sensitive to shock as to prohibit subjecting the particles to such agitation as is required to establish free random movement of the particles.

While any electromagnetic radiation capable of heating the free water content of the particles to be dried can be employed, it is most advantageous to employ radio frequency electromagnetic radiation because such radiation causes essentially instantaneous heating of the moisture content selectively, with no or negligible heating of the solid matter of the particle at the outset. Selective heating of the moisture assures that at least a major proportion of the free moisture content of the particle will be driven to the particle surfaces for escape to the atmosphere surrounding the particles.

For practical purposes, it is convenient and advantageous to employ room temperature air as the relatively cool gaseous atmosphere maintained in the drying zone trough, though in some cases, it is helpful to cool the gaseous atmosphere.

TYPICAL APPARATUS FOR PRACTICING THE METHOD

FIGS. 5–6 illustrate a particularly advantageous apparatus for carrying out the method. Here, the apparatus comprises a generally horizontal trough 20, a conventional electromagnetic vibrator 21, an upper electrode 22, and a lower electrode 23.

Trough 20 consists of an elongated integral body formed of polymeric material having good dielectric properties, i.e., a low dielectric constant and a low power factor, so as not to be unduly heated by radio frequency energy. Typically, the trough can be of polytetrafluoroethylene, or of a fiber glass reinforced epoxy resin, or a fiber glass reinforced silicone polymer. The trough is of U-shaped transverse cross section, having a flat bottom wall 24 and flat side walls 25, 26, and can be open at both ends. Trough 20 can be supported in horizontal position solely via its connection to vibrator 21, or additional supporting means (not shown) of the vibration isolator type can be employed.

Vibrator 21, FIG. 5, is stationarily mounted and includes a vibratory output member 27. A rigid channel member 28 extends along the bottom face of bottom wall 24 of the trough, being aligned along the longitudinal center line of the trough and rigidly secured to bottom wall 24, as by fasteners 29 made of polymeric material. The output member 27 of vibrator 21 is secured to the bottom face of a block 30 which is disposed in and secured rigidly to the end portion of channel member 28. Block 30 can be of rigid dielectric material to provide additional RF isolation for the vibrator.

Electrodes 22 and 23 are elongated hollow metal electrodes of rectangular plan conforming to that of the trough. Advantageously, the electrodes are of aluminum. Electrode 22 comprises a body 31 having a flat rectangular bottom wall 32, flat side walls 33 and 34, and flat end walls 35 and 36, the top of the hollow structure defined by body 31 being closed by a flat top plate 37. A plurality of partitions 38 project inwardly from wall 33, and a plurality of partitions 39 extend inwardly from wall 34, the partitions being shorter than the space between the side walls. Partitions 38 are spaced apart lengthwise of the electrode, as are partitions 39, and the two sets of partitions and the electrode walls thus cooperate to define a tortuous flow path from end wall 35 to end wall 36. A cooling liquid supply tube 40 opens through end wall 35 to supply liquid to the interior of the electrode, and the cooling liquid is discharged via an exhaust tube which opens through end wall 36.

Electrode 23 similarly comprises a main body 40 having a flat rectangular bottom wall 41, flat side walls 42 and 43, and flat end walls 44 and 45, the top of the hollow structure defined by body 40 being closed by a top member 46 which is mainly flat but includes a longitudinally extending central channel 47 dimensioned to freely accommodate member 28. Alternating partitions 48, 49 are provided as described with reference to partitions 38, 39. Cooling liquid is supplied to the interior of electrode 23 by a supply tube 50 at end wall 44 and is discharged via exhaust tube 51 at end wall 45.

Electrodes 22 and 23 are connected to a suitable radio frequency generator, as shown in FIG. 1, in any suitable fashion, as by a conventional coaxial cable.

Electrodes 22 and 23 are of equal length and are mutually parallel and in vertical alignment. Trough 20 is longer than electrodes 22, 23 and is disposed between the two electrodes, with the input end 20a of the trough projecting well beyond the respective vertically aligned ends of the electrodes. A delivery funnel 65 is arranged above the delivery end 20a of the trough, being supported by any suitable support means, such as the shielding means for the apparatus (not shown), independent of the trough. As seen by comparison of FIGS. 5 and 7, the spout 66 of the funnel is of elongated rectangular cross section, the width of the spout being only slightly less than the space between side walls 25, 26 of trough 20, and the funnel being so positioned that the open bottom end of spout 66 is spaced above bottom wall 24 of the trough by a distance slightly greater than the depth desired for the bed of particulate material to be established in the trough.

Between funnel 65 and electrodes 22 and 23, an adjustable blade 67 is provided to assure that the depth of the bed of particulate material will be essentially uniform across the width of the trough. Blade 67 is in the form of a flat plate of polytetrafluoroethylene or equivalent dielectric material, the plate being slotted near its ends to accommodate side walls 25, 26 of the trough in slidable fashion so that, with the blade lying in a vertical plane, it can be moved upwardly or downwardly to adjust the distance between the bottom edge 67a of the blade and bottom wall 24 of the trough. A projection 68 is secured to blade 67 at the top thereof and projects toward the electrodes. A vertical adjusting screw 69 has an unthreaded shank portion journalled in projection 68, the threaded shank of the screw depending therefrom and being engaged in a threaded bore through a cross member 70, the ends of the cross member being rigidly fixed to side walls 25 and 26, respectively. Knurled head 71 of the screw 69 is exposed above support 68 so that manual manipulation of the screw to adjust the vertical position of blade 67 is easily accomplished. Elements 68–71 are advantageously of rigid polymeric material having good dielectric characteristics so as not to be unduly heated by radio frequency energy.

Vibrator 21 acts through rigid output member 27 and channel member 28 to vibrate trough 20 at relatively high frequency and low amplitude in the direction of arrow 21a. During each cycle of vibratory movement, the trough is moved through a very short distance upwardly and away from vibrator 21 and then in the reverse direction, downwardly and toward the vibrator. By design and adjustment of the vibrator 21, the frequency and amplitude of the vibratory movement of the trough can be predetermined in accordance with the particle size and density of the particulate material involved, and the throughput rate (and thus the residence time) required for the particular thermal treatment to be accomplished. Advantageously, the trough is vibrated at a frequency of 3600 cycles per minute, with an amplitude or excursion of less than the bed depth.

The particulate explosive material is supplied at a constant rate such as to establish on the bottom wall of trough 20 a bed of particulate material having a static depth, i.e., that depth which would exist if the trough were not vibrating, typically on the order of 1/16 in. (1.59 mm.) the bed being rendered uniform by the levelling action of blade 67. The vibratory motion imparted to the trough by vibrator 21 serves two functions, which can be considered broadly as conveying and agitating. Conveying occurs because the upward portion of each cycle of vibratory motion of bottom wall 24 of the trough projects all of the particles upwardly and toward the delivery end of the trough, the particles then being out of engagement with the bottom wall until the upward portion of the next cycle of movement. Thus, considering the idealized case of only a single particle, rather than a bed of particles, the single particle is engaged and projected by a different point on the surface of the bottom wall during ech cycle of the vibratory movement, the points being spaced apart by small distances so as to lie in a series progressing from the input end to the discharge end of the trough. Since contact between the particles and bottom wall 24 of the trough is instantaneous, the particles are kept in essentially constant movement and, as a result of that movement, the surfaces of the particles are subjected to the air or other gaseous atmosphere in which the trough is located rather than residing in long term contact with the solid surfaces of the trough or the surfaces of adjacent particles. Additionally, with side walls 24, 26 of the trough having a height which is large in comparison with the bed thickness and the amplitude of vibratory movement, trough 20 serves to confine the particulate material to a path of travel which is between and aligned longitudinally with the elongated electrodes 22 and 23.

A particular advantage of the apparatus is that it makes it possible to pass a mass of particulate material through a defined drying zone and to subject the material to radio frequency energy throughout its residence time in the drying zone, with each particle being subject to only a minimum of contact with surfaces other than those of the particulate material during the treatment. A more predictable and assured drying treatment is thus accomplished than has heretofore been possible with apparatus in which the particulate material is supported as a static bed.

EXAMPLE 1

Nitrocellulose base (conventional "smokeless") gun powder was removed from eight commercial shotgun shells. The powder was in the form of discoid particles with a maximum dimension of approximately 0.009 in. (0.24 mm.). Moisture content of the particles was approximately 2.3% by weight. A laboratory scale apparatus constructed generally as shown in FIGS. 5–7 was employed, with the vibratory conveying trough of molded epoxy resin reenforced with fiber glass and with deionized water supplied as the coolant for electrode 8. The RF generator employed was a Model EO-1, supplied by W. T. Larose & Associates, Inc., Troy, New York, with a power output (useful RF power capacitively coupled into the load) of 500 watts, and a normal frequency range of 67–80 MHz. The RF generator was operated at a plate current of 125 milliamperes to establish an RF field, between electrodes 7 and 8, of 70 MHz, with an RF voltage of 10,000, determined by an RF voltage probe inserted between the electrodes. The ambient atmosphere was at 75° F. and a relative humidity of 20%. The total amount of the gun powder was supplied to the input end of the vibratory conveying trough, with the vibrator operated at 3600 cycles per minute and an amplitude of 0.009 in. The RF field established between the electrodes extended for the full width of the conveying trough and for 26 in. of the length of the trough. Residence time of the gun powder on the trough was about 5 seconds, with residence time within the RF field being approximately 4 seconds. The gun powder was collected in a plastic cup at the discharge end of the conveying trough and returned immediately to the input end of the trough, the procedure being repeated until the gun powder had been passed through the RF field five times, giving a total residence time in the field of approximately 20 seconds. After the last pass, the gun powder was collected and found to be in the form of particles distinctly larger and more spheroidal than the initial material, with a moisture content of 1.25% by weight. The dried particles had an average maximum particle dimension of approximately 0.013 in. (0.33 mm.).

EXAMPLE 2

The procedure of Example 1 was repeated, employing the same apparatus but without cooling of the lower electrode. The material dried was commercially produced nitrocellulose based gun powder in the form of generally spherical pellets having a diameter of approximately 0.01 in. (0.25 mm.). The gun powder was reported by the manufacturer to be a high density powder containing 10% by weight nitroglycerine and 5% by weight dibutylphthalate. The RF generator was operated at a plate current of 250 milliamperes. The conveyor vibrator was operated at 3600 cycles per second and an amplitude of approximately 0.008 in. (0.20 mm.). Spacing of the upper electrode from the bottom of the trough was 0.25 in. (0.635 mm.). Room temperature was approximately 80° F. and the relative humidity of the ambient air was approximately 35%. The particulate material was collected at the discharge end of the trough until all of the material had passed through the 26 in. long RF field 40 times, giving a total residence time in the field of approximately 160 sec. Temperature of the particulate material during drying was as follows, each value being after the material was discharged at the end of the pass through the trough:

| Pass No. | Temperature (° F.) |
|---|---|
| 7 | 94 |
| 10 | 104 |
| 20 | 114 |
| 40 | 115 |

The gun powder so treated was sealed in glass containers for 1 day at room temperature and then subjected to 15 passes through the apparatus in the same manner but with the lower electrode cooled. The total residence time in the RF field was thus approximately 220 sec. Total free moisture-and-volatiles content of the dried gun powder was 0.50% by weight. The diameter of the spherical particles of the dried material was observably smaller than that of the particles of the starting material.

EXAMPLE 3

To demonstrate the relative safety of the method, the procedure of Example 2 was repeated but with the conveyor trough first dusted with graphite and with the plate current at 180 milliamperes. Gun powder from the same production lot as in Example 2 was passed through the RF field 60 times. Due to presence of the graphite in the RF field, extensive sparking occurred in the field. At any time during the procedure, about 12 sparks could be observed, appearing as discharges between the trough and the upper electrode, spaced throughout the field. No ignition of the gun powder occurred. Temperature of the gun powder was as follows:

| Pass No. | Temperature (° F.) |
|---|---|
| 23 | 88 |
| 34 | 91 |
| 60 | 85 |

EXAMPLE 4

Gun powder from the same source and of the same kind as employed in Example 2 was dried in the same apparatus. Relative humidity of the ambient air was 50% and room temperature about 75° F. The gun powder was passed 45 times through the apparatus, with the temperature of the material at the end of the last pass being approximately 100° F. The RF generator was operated to maintain the plate current between 230 and 210 milliamperes. The vibratory conveyor was operated as in Example 2. Total free moisture-and-volatiles was 7.81% for the starting material, 0.40% for the dried products.

EXAMPLE 5

The procedure of Example 2 was repeated with a commercial nitrocellulose base gun powder in the form of spherical particles having a diameter of approximately 0.01 in. (0.25 mm.), and a total free moisture-and-volatiles content of 27.78% by weight. The material was passed through the apparatus 32 times, giving a total residence time in the RF field of approximately 130 seconds, while maintaining the plate current of the RF generator between 220 milliamperes and 240 milliamperes. The total free moisture-and-volatiles content of the dried product was 0.68% by weight.

EXAMPLE 6

A solid rocket propellant referred to in the trade as a "double base shock gel" was dried. The material was in the form of orange colored generally spherical pellets having a diameter of approximately 0.0625 in. (1.59 mm.). Initial moisture content of the material was 72.7% by weight. Room temperature air was the gaseous agent, at 60° F. and a relative humidity of 25–30% throughout the drying operation. The material was passed through the drying apparatus employed in Example 2, with cooling of the lower electrode, until the total residence time of the sample in the RF field was 630 seconds. The radio frequency generator was operated with the plate current held between 200 milliamperes and 250 milliamperes by manual adjustment. The conveyor vibrator was operated at 3600 cycles per second and an amplitude of about 0.01 in. (0.25 mm.). Moisture content values determined for the material are as follows:

| Residence Time In RF Field (Secs.) | Moisture Content (% by wt.) |
|---|---|
| 0 | 72.7 |
| 70 | 68.6 |
| 140 | 63.1 |
| 210 | 54.2 |
| 280 | 45.4 |
| 350 | 35.6 |
| 420 | 24.3 |
| 490 | 10.4 |
| 560 | 3.6 |
| 630 | less than 0.01 |

The diameter of the particles of dried material was observed to be about one half of the diameter of the particles of the starting material.

What is claimed is:

1. The method for drying explosive materials, comprising supplying the explosive material in particulate form to a drying zone;

passing the particulate explosive material through the drying zone while agitating the explosive material to cause the particles thereof to move in random fashion without residing in contact with any solid surface and with no significant portion of the particulate material residing as a relatively static mass of particles;

subjecting the particulate explosive material to radio frequency radiation to heat the moisture contained within the particles while the particulate explosive material is being agitated in the drying zone;

maintaining a gaseous atmosphere in the drying zone during said steps of agitating and subjecting to radio frequency radiation, said step of subjecting the particulate explosive material to radio frequency radiation causing moisture contained within each particle to be vaporized without substantial direct heating of the particle, random movement of the particles of the explosive material resulting in exposure of the entire surface of each particle to said gaseous atmosphere for escape of the moisture from the particle into the atmosphere and transfer of heat from the particle to said gaseous atmosphere; and recovering the particulate explosive material from the drying zone with the particles thereof having a reduced moisture content and a temperature which is low as compared to the ignition temperature of the particles.

2. The method according to claim 1, wherein said step of passing the particulate explosive material through the drying zone is carried out by supplying the particulate material to a vibratory conveyor wherein the vibratory surfaces are formed of nonmetallic material having good dielectric properties.

3. The method according to claim 2, wherein travel of the particulate explosive material through the drying zone is generally horizontal; and said step of subjecting the particulate explosive material to radio frequency radiation is accomplished by establishing a radio frequency field between two electrodes arranged one below and one above the conveyor;

the method further comprising cooling the electrode below the conveyor.

4. The method according to claim 3, wherein the electrode above the conveyor is also cooled.

5. The method according to claim 1, wherein said step of subjecting the particulate explosive material to radio frequency radiation is accomplished by establishing a radio frequency field between two electrodes which are spaced apart across the path of travel of the particulate explosive material and which converge in the direction of travel of the particulate explosive material through the field.

6. The method according to claim 1, wherein said step of subjecting the particulate explosive material to radio frequency radiation is accomplished by establishing a radio frequency field between two electrodes which are spaced apart across the path of travel of the particulate explosive material;

the method further comprising detecting in the drying zone a variable characteristic resulting from application of the radio frequency field; and adjusting the applied power of the radio frequency field in accordance with the value of the characteristic so detected.

7. The method according to claim 6, wherein said step of adjusting the applied power of the radio frequency field is accomplished by adjusting the space between the electrodes.

8. The method according to claim 6, wherein said variable characteristic is temperature.

9. The method according to claim 1, wherein the particulate explosive material is a nitrocellulose base gun powder.

10. The method according to claim 1, wherein the particulate explosive material is a solid rocket propellant.

11. The method according to claim 1, wherein the particulate explosive material is agitated by contact with a vibratory surface which is of inert polymeric material.

* * * * *